Sept. 30, 1947.  C. H. FAY  2,428,326
GO-DEVIL DEVICE FOR LOCATING OBSTRUCTIONS IN PIPE LINES
Filed Nov. 27, 1943  2 Sheets-Sheet 1
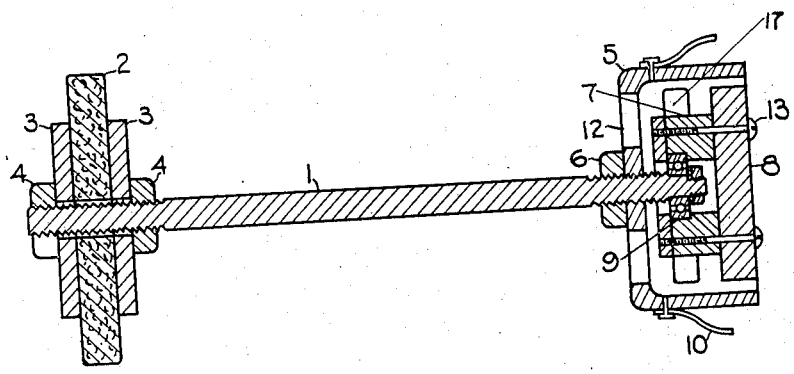
Fig. 1
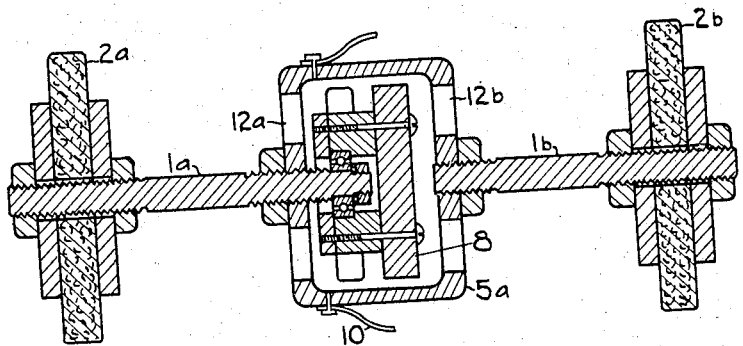
Fig. 2
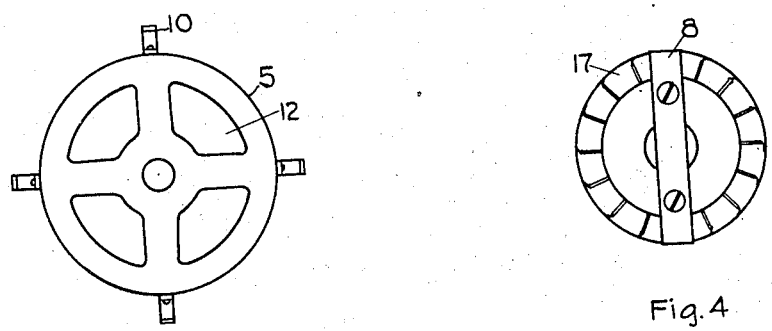
Fig. 3
Fig. 4
Inventor: Charles H. Fay
By his Attorney:

Inventor: Charles H. Fay
By his Attorney:

Patented Sept. 30, 1947

2,428,326

UNITED STATES PATENT OFFICE 2,428,326

GO-DEVIL DEVICE FOR LOCATING OBSTRUCTIONS IN PIPE LINES

Charles H. Fay, Houston, Tex., assignor to Shell Development Company, San Francisco, Calif., a corporation of Delaware Application November 27, 1943, Serial No. 512,064

3 Claims. (Cl. 73—151)

This invention relates to the operation and maintenance of pipe lines, and pertains more particularly to the location of obstructions in pipe lines by magnetic means.

It is a frequent experience of pipe line operators that scrapers or go-devils used for cleaning the line may become jammed at some point in the line, usually at some bend or valve. The location of the jammed scraper has often been a tedious and costly enterprise.

While the scrapers are so designed that the rubber discs by means of which they are propelled by the fluid break down or are deflected away to permit the passage of some fluid through the line, the effect of a jammed scraper is nevertheless to increase pumping costs and reduce throughput while it remains in the line.

Jammed scrapers have been located in the past by digging so-called bellholes to the line at frequent intervals over the section of line in which the scraper is known to be, placing listeners at the bellholes, and running a second scraper in the line. The jammed scraper is then located between the last bellhole at which the scraper was heard and the first at which it was not heard. At best the scraper may be found at a bend or valve in the interval; at worst the section of line between bellholes must be torn up.

It is therefore the object of this invention to provide a device for locating jammed scrapers or other obstructions in pipe lines by observation from the earth's surface above the line.

It is also an object of this invention to provide a pipe line scraper or go-devil carrying means for conveying to the outside of the pipe line a magnetic signal indicating the exact location, within a few feet, of said scraper inside the pipe line.

The means of accomplishing this will be understood from the following description taken with reference to the attached drawings, wherein:

Figs. 1 and 2 are diagrammatic views in cross-section of two embodiments of the pipe line scraper or rotating magnet signaler of the present invention;

Fig. 3 is a view, taken at right angles to that of Fig. 1, of the magnet housing dismounted from the scraper;

Fig. 4 is a view, taken at right angles to that of Fig. 1, of the turbine element dismounted from the scraper.

Figure 5:
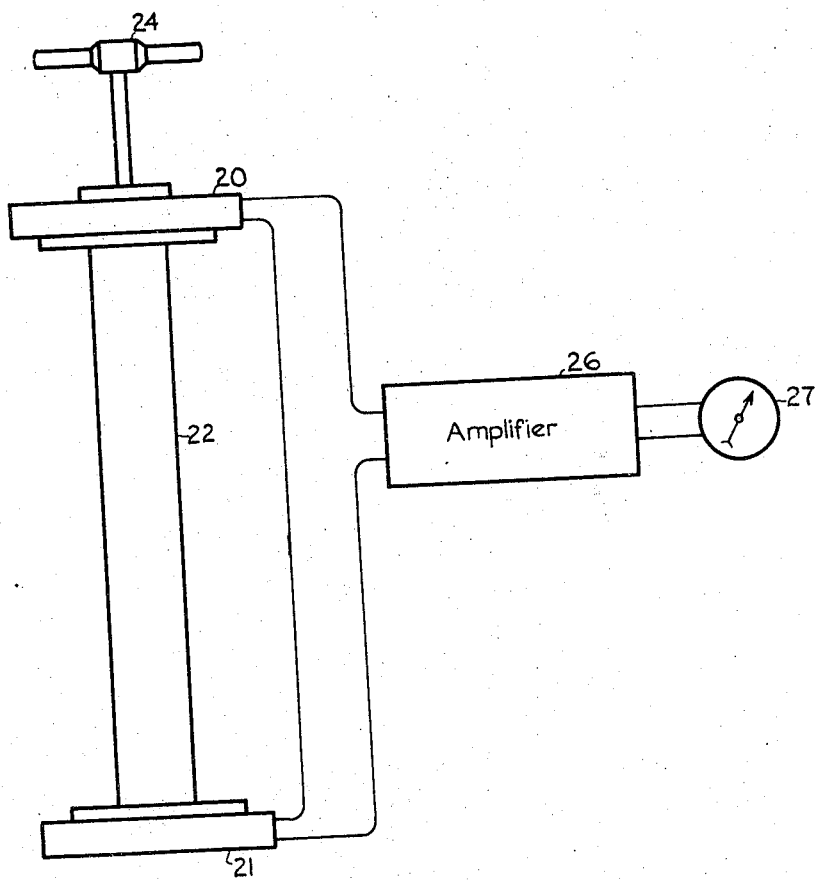
Fig. 5 is a diagrammatic view of a suitable magnet detecting device for use in conjunction with the magnet signaler of the present invention.

Referring to Fig. 1, the rotating magnet signaler consists of a frame or rod member 1 carrying a suitable disc or piston 2 made of material such as synthetic rubber, leather, treated canvas, etc. and affixed to the rod 1 by washers 3 and nuts 4, this assembly serving to enable the device to be propelled along the pipe in fluid flow to propel the device along the pipe in a manner understandable to those familiar with pipe line scrapers.

If desired, more than one disc may be mounted on the rod 1, which may also have mounted thereon all necessary tools for scraping and cleaning the pipe line, such as roller cutters, knife cutters, wire brushes, etc. These tools, being conventional are not shown in the drawings for simplicity.

Similarly mounted on the rod 1 and secured thereto by means of a locknut 6, is a housing 5, preferably made of a non-magnetic material such as copper or aluminum, which protects a fluid turbine 7. The turbine 7 is mounted on the rod 1 preferably by means of a ball-bearing mechanism 9 and comprises a rotor element having a plurality of blade elements 11, as shown in Fig. 4, whereby the turbine is caused to rotate about the axis of the rod 1 by the fluid flowing past the scraper. Affixed to the turbine by means such as screws 13 is a bar magnet 8, preferably made of a steel alloy having high magnetic retentivity properties. The housing 5 is provided with windows 12 to facilitate the flow of the fluid past the scraper. A plurality of springs 10 are conveniently provided on the outside of housing 5 to facilitate the motion of the device in the line.

Instead of mounting the turbine at one end of the scraper, the turbine may be mounted in any other desired manner, for example, in the middle, as shown in Fig. 2. This arrangement is in all points similar to that of Fig. 1, except that the rod 1 is made of two parts, 1a and 1b, which are held together by the housing 5a, completely surrounding the turbine mechanism and provided with windows 12a and 12b for fluid circulation.

When the rotating magnet signaler reaches an obstruction in the line and is stopped thereby, the disc 2 is broken down or deflected by the large pressure differential resulting, so that flow continues, although at a reduced rate. Part of the fluid will now flow through the blades 17 of turbine 7 and cause it and magnet 8 to rotate. By suitable choice of blade angle of the elements 17 and the like, the speed of rotation may be held at a predetermined value of the order of 5 to 10 revolutions per second for reasonable speeds of fluid flow.

The rotation of magnet 8 produces a corresponding alternating magnetic field in the neighborhood of the rotating magnet signaler. The alternating field produced outside the pipe is, of course, weakened by the shielding effect of the walls of the pipe. Thus, a test run with a 6" I. D. pipe having a wall thickness of 5/16" showed, for example, that the field outside the pipe was of the order of one twentieth of that observed with the pipe removed. In spite of this, a readily detectable field can be obtained several feet from the pipe. Since the means of detection used, as will presently be described, is sensitive only to varying or alternating fields, the permanent and the earth-induced magnetization of the pipe itself, and fields due to electric currents in the pipe do not interfere with the operation of the signaler.

It is understood that a variety of detecting devices may be used for locating the signaler by means of the alternating magnetic field it produces. One such device is shown by way of example and is illustrated diagrammatically in Fig. 5. Referring to Fig. 5, the pickup element consists of two coils, 20 and 21, mechanically fixed with respect to each other by a rigid mounting 22, the assembly being provided with a handle 24 for carrying the device in the field. Coils 20 and 21 are made as nearly equal in turn area, and their median planes as nearly parallel as practical, so that the electromotive forces induced in each coil when the pickup element is moved in a uniform field are practically equal. The coils are electrically connected in series opposition to an amplifier 26, said amplifier being designed to have its maximum amplification in the frequency range within which the signaler operates, and to filter or cut off rapidly all other frequencies, as well understood by those familiar with the art of electronics. The output of the amplifier is fed to an indicator 27, which may conveniently be a center-zero pivot or taut suspension pointer galvanometer of sufficiently short period to vibrate satisfactorily at frequencies within the range in which the signaler operates. Variations of the indicating means, such, for example, as the provision of an audible indication for example, by means of ear-phones, by using the amplified signal to modulate an audio frequency, will be obvious to those skilled in the art.

In practicing the invention, the present signaler is put into the pipe line upstream from the obstruction. It will be stopped by the obstruction, at which point its magnet will begin to rotate as previously described. An operator now walks the line with the detector, holding the pickup device over the line. While the pickup has been designed, as previously explained, to give negligible response from its motion in a uniform field, it will respond somewhat to rapid motion in the field due to the pipe line, since said field has different values at the two coils. Indeed, the line may be located in case of doubt by shaking the pickup rapidly at different locations and observing the swing of the indicator pointer. If the pickup is carried smoothly, however, the slowly varying signal produced by its motion in the pipe line field will be greatly attenuated by the low frequency cutoff of the amplifier, and oscillation of the indicator pointer from this cause will be small compared to that produced when the pickup is over the signaler. Moreover, if the operator by a sudden motion of the pickup produces a suspicious motion of the pointer, he will stop and observe the pointer with the pickup at rest, so that the pipe line field can only serve as a source of some delay in the survey.

When the pickup comes nearly over the signaler, said signaler will of course induce a larger voltage in the nearer coil than in the farther, and hence provide a net voltage input to the amplifier and a corresponding swinging of the indicator pointer at the frequency of rotation of the signaler. This periodic swinging is easily recognizable, so that location of the signaler, and hence of the obstruction at which it stopped, is rendered a comparatively simple matter by the present invention.

I claim as my invention:

1. For use in combination with a magnetic detector, a go-devil adapted to be moved by fluid flow along and within a pipe line, a rotor carried by said go-devil, and a magnet element affixed to said rotor, said rotor being adapted to be rotated by the fluid flow past said go-devil, whereby the rotational displacement of the magnet element produces a pulsating magnetic field, said magnetic field being detectable by said detector outside said pipe line.

2. For use in combination with a magnetic detector, a go-devil insertable into a pipe line carrying a fluid flow, said go-devil having an elongated frame member co-axial with said pipe line, resilient piston means affixed to said frame member at right angles to the axis thereof, whereby said go-devil is caused to move within and along said pipe line by said fluid flow, said piston means being deformable by said fluid flow to permit the fluid to flow past the go-devil when the go-devil is arrested within said pipe line, a rotor carried by said frame member, and a magnet element affixed to said rotor, said rotor being adapted to rotate in response to the fluid flow past said go-devil, whereby the rotational displacement of the magnet element produces a low-frequency pulsating magnetic field, said magnetic field being detectable by said detector outside said pipe line.

3. The device of claim 2, comprising a housing surrounding said rotor element, said housing being attached to said frame member, said housing having apertures through the walls thereof adapted to permit a fluid flow past said rotor element.

CHARLES H. FAY.

REFERENCES CITED

The following references are of record in the file of this patent:

UNITED STATES PATENTS

| Number | Name | Date |
| --- | --- | --- |
| 1,406,682 | Rathbone | Feb. 14, 1922 |
| 1,662,429 | Lowy | Mar. 13, 1928 |
| 2,092,951 | Blake | Sept. 14, 1937 |
| 2,299,406 | Potter | Oct. 20, 1942 |